US007913832B2

(12) United States Patent
Voser

(10) Patent No.: US 7,913,832 B2
(45) Date of Patent: Mar. 29, 2011

(54) METHOD AND APPARATUS FOR VALIDATING BANK NOTES

(75) Inventor: Christian Voser, Vessy (CH)

(73) Assignee: MEI, Inc., West Chester, PA (US)

( * ) Notice: Subject to any disclaimer, the term of this patent is extended or adjusted under 35 U.S.C. 154(b) by 574 days.

(21) Appl. No.: 11/755,561

(22) Filed: May 30, 2007

(65) Prior Publication Data

US 2007/0278065 A1 Dec. 6, 2007

(30) Foreign Application Priority Data

May 31, 2006 (EP) .................................... 06252819

(51) Int. Cl.
*G06K 7/00* (2006.01)
*G07D 7/00* (2006.01)

(52) U.S. Cl. ....................................... 194/207; 194/302

(58) Field of Classification Search .................. 194/207, 194/302, 206

See application file for complete search history.

(56) References Cited

U.S. PATENT DOCUMENTS

| | | | | |
|---|---|---|---|---|
| 4,587,434 | A | 5/1986 | Roes et al. | |
| 5,027,415 | A | 6/1991 | Hara et al. | |
| 5,498,879 | A | 3/1996 | De Man | |
| 5,503,262 | A * | 4/1996 | Baudat et al. | 194/206 |
| 6,731,785 | B1 * | 5/2004 | Mennie et al. | 382/135 |

FOREIGN PATENT DOCUMENTS

| | | |
|---|---|---|
| EP | 0 560 023 A1 | 9/1993 |
| EP | 0 679 279 B1 | 5/1999 |
| EP | 0 731 737 B1 | 1/2002 |
| EP | 1 321 904 A1 | 6/2003 |
| GB | 1 563 454 | 3/1980 |
| JP | 57-196381 | 12/1982 |
| WO | 94/16412 | 7/1994 |
| WO | 96/10808 | 4/1996 |
| WO | 01/16870 | 3/2001 |

* cited by examiner

*Primary Examiner* — Stefanos Karmis
*Assistant Examiner* — Mark J Beauchaine
(74) *Attorney, Agent, or Firm* — Fish & Richardson P.C.

(57) ABSTRACT

A banknote validator takes both reflection and transmission optical measurements at different wavelengths. An emitter and sensor on one side of the banknote path are used to make a calibration measurement using light reflected from a window on the other side of the path, overlying another optical device. Each measurement is normalised on the basis of multiple measurements of different wavelengths, distributed over a substantial area, such as along the relevant scan line, preferably using a value representing the dispersion of the measurements.

13 Claims, 4 Drawing Sheets

METHOD AND APPARATUS FOR VALIDATING BANK NOTES

BACKGROUND OF THE INVENTION

1. Field of the Invention

This invention relates to a method and an apparatus for validating banknotes.

2. Background

It is well known to validate banknotes by taking measurements of the optical characteristics of the banknote and to process the measurements together with acceptance criteria to determine whether the banknote belongs to a predetermined class, or denomination. The banknote can be scanned and reflected or transmitted light, or both, can be used to measure the optical characteristics. The characteristics of the banknote at different light wave lengths (some or all of which may be non-visible) may be measured.

The characteristics of the components of the apparatus, such as light emitters or sensors, may vary from apparatus to apparatus, and from time to time. Consequently, the sensors of the apparatus cannot be relied upon to give stable and predictable measurements.

It is known to mitigate this problem by frequently calibrating the apparatus. Various calibration techniques can be used. For example, in reflective systems, a reflective surface may be provided on the opposite side of the bill path from the light emitter and sensor so that, when no bill is present, a calibration measurement may be made by illuminating the surface and detecting the amount of light reflected to the sensor. This calibration measurement may be used to adjust the intensity of the light emitted by the emitter and/or the gain applied to the signal from the sensor so that a predetermined measurement is obtained.

This technique is not readily adaptable to systems in which light transmission through the banknote is measured, because the reference surface would interfere with the light path. One solution to this, involving a movable reference surface, is disclosed in EP-A-0731737. Alternatively, the reference surface may take the form of a calibration sheet which is moved into the bill path when a calibration measurement is to be performed.

EP-A-0679279 discloses an apparatus for detecting counterfeit banknotes in which the banknote is manually swept past a light emitter and sensor housed within a unit having a glass window. In that arrangement, the lamp intensity is monitored by detecting the amount of radiation internally reflected from the window. However, such an arrangement is also unsuitable for transmission systems.

These calibration techniques also suffer from a number of further disadvantages. For example, when using a calibration sheet, the calibration operation either needs to be performed manually, which is inconvenient and inappropriate where frequent calibration is required, or, if it is automatic, complicated sheet-driving structures need to be provided. Also, the calibration techniques rely upon the reference surfaces having stable optical characteristics, and this is not always the case; for example, the optical characteristics may alter as a result of contamination by dirt, etc.

It is also known to mitigate the problem of component variation by performing normalisation of sensor measurements. See for example EP-A-0560023. Each banknote is scanned along respective different tracks. Within each track, for each colour being measured, the same components are used to take the measurements throughout the track. The measurements are normalised by taking the ratio of the measurement to the sum of the measurements for the same colour throughout a scanned track along the banknote ("spatial normalisation"). Therefore, the effects of component variation are reduced.

However, such spatially normalised measurements are relatively insensitive to the relative amounts of different colours and therefore are not suitable for accurate authentication of the banknotes. Accordingly, measurements were also normalised using another technique. According to this further technique, the measurements of different colours within a particular region were normalised by deriving the ratio of each measurement to the sum of all the measurements for the different colours in that area. This "spectral normalisation" technique maintains the colour information and thus is useful for authentication. Also, the technique effectively makes the measurements insensitive to the brightness in each region of the banknote, and thus less sensitive to the amount of dirt on the banknote. Accordingly, new (clean) and old (dirty) banknotes will exhibit less measurement dispersion, and thus improve recognition performance. However, because the spectrally normalised measurements are sensitive to component variations, and because the luminance information is reduced, the measurements are not good for determining banknote denomination.

Accordingly, although current banknote validators deal with the problem of component variation, both the normalisation techniques and the calibration techniques would benefit from improvements, particularly (but not only) in transmission systems.

SUMMARY OF THE INVENTION

Aspects of the present invention are set out in the accompanying claims.

The invention provides alternative solutions to the problems mentioned above. One solution provides a way in which calibration measurements can be readily performed even in apparatus relying on transmission techniques. Other solutions involve normalisation techniques which reduce the data loss of the normalisation techniques mentioned above while still providing compensation for component variations. Although in principle each technique can be used to advantage without using the other technique (and the present patent application is intended to cover such usage) there are particular synergistic advantages to using the techniques in combination, as will be explained below.

According to a first further aspect of the invention, a banknote validator has, on one side of a banknote path, an emitter and a sensor to enable measurements of the optical characteristics of a banknote using light emitted by the emitter and reflected (preferably diffusely) by the banknote to the sensor. There is also an optical device on the opposite side of the banknote path to enable transmission characteristics of the banknote to be measured. The optical device may be a second sensor for receiving light from the emitter on the opposite side of the path, or may be a second emitter for transmitting light through the banknote to the sensor on the opposite side of the path. The optical device has an overlying window disposed between the device and the banknote path. A calibration measurement is obtained using light from the emitter on the first side of the path which crosses the banknote path and is then reflected by the window back across the path to the sensor on the first side of the path.

There may be more than one optical device on the second side of the path, e.g. an emitter and a sensor to enable reflection and transmission measurements to be made on both sides of the banknote path. Each optical device has a window; the optical devices may share a common window.

The use of a window allows calibration readings to be taken without difficulty despite the fact that the apparatus is arranged to take transmission measurements. The window assists in preventing dust and dirt collecting on the optical device and/or components associated therewith such as a lens. Dust may collect on the window itself; however, this can be more readily cleaned, particularly if the window is planar.

Using such a calibration technique, it is possible to compensate for component variations which would otherwise cause uncertainty in the relative colour levels. This is achieved by taking into account the calibration measurements, which will indicate the relationships between the levels of the different colours.

Assuming that the window has a known and constant reflectivity, such a calibration technique would also permit compensation for component variations which affect the measurement of brightness levels. However, when using a window for calibration measurements, it may be difficult to ensure that such conditions are met, especially if the window may collect dust.

According to a second further aspect of the invention, a banknote validation apparatus is arranged to normalise optical measurements of a banknote by determining the extent to which each measurement differs from an average of multiple measurements of different colours each at plural different positions of the banknote. The normalised value may be a function of the ratio of the measurement to the average value. Thus, the measurements are both spectrally and spatially normalised. Preferably, the apparatus has a plurality of sensors, each of which scans a track of the banknote, and each measurement is normalised using the other measurements made by the same sensor.

Combining both spectral and spatial normalisation reduces the information loss while also providing a degree of compensation for component variation. In particular, the normalised measurements will retain almost all the information relating to relative colour levels, thereby providing an improvement over spatial normalisation. Also, the normalised measurements will be relatively insensitive to the overall brightness level throughout the area containing the measurements upon which normalisation is based. The insensitivity to brightness levels will (i) compensate for component variations which affect measured brightness (therefore providing improvements compared with spectral normalisation) and (ii) reduce—to some extent—measurement dispersion resulting from banknotes in different conditions. Accordingly, a single normalisation operation (resulting in a single set of measurements for processing) can produce benefits as compared to the two separate spectral and spatial normalisation techniques of the prior art. However, component variations which affect the relationship between colour measurements may not be fully compensated. Furthermore, the particular advantages of the separate spectral and spatial normalisation processes will be mitigated by combining the two processes. It is therefore not evident that such a combination will give an overall advantage. However, it has now been found that significant advantages can be obtained, especially (but not only) if the combined spatial/spectral normalisation is used with a calibration technique.

It will in particular be appreciated that there is a special advantage to combining the first and second further aspects of the invention. The calibration technique of the first further aspect is inexpensive and easily implemented, and enables compensation for component variations which may not be fully handled by the normalisation technique of the second further aspect (i.e. those which affect the relationship between colour measurements). On the other hand, if the calibration technique does not compensate for component variations affecting measured brightness levels, these are instead handled by the normalisation technique, because measurements which are normalised on the basis of multiple colours distributed over a substantial area of the banknote will be relatively insensitive to overall brightness levels. Accordingly, the described calibration and normalisation steps result in stable, predictable measurements which preserve a large quantity of information relating to relative colour levels.

Thus, a preferred embodiment of the invention is an apparatus wherein a calibration measurement is made by an emitter and sensor on one side of the banknote path using light reflected from a window on the opposite side of the banknote path and overlying a further optical device, and at least some of the measurements taken using the emitter and sensor are normalised to obtain a value which represents the extent to which the measurement differs from the average of multiple measurements relating to multiple wavelengths at multiple positions extending over the banknote.

The invention also extends to a third further aspect, according to which a measurement of a particular wavelength at a particular position is normalised with respect to a measurement group comprising measurements of a plurality of wavelengths (including said particular wavelength) at one or more positions (including said particular position), so that the normalised measurement represents a relationship between that measurement and a value representing the dispersion of measurements within the group. Preferably, the normalised measurement is obtained by taking the ratio of (i) the difference between the measurement and the average measurement of the measurement group, and (ii) the value representing the dispersion of measurements within the group. The dispersion value may be the standard deviation of the measurements. Such a technique provides advantages in reducing the effects of measurement dispersion due to variations in ink density caused by wear or as a result of varied printing conditions.

The normalisation technique of the third further aspect of the invention may be used instead of the above-described normalisation technique of the second further aspect of the invention. Alternatively, both techniques may be used, either (a) by performing a single normalisation operation which complies with both the second and third further aspects of the invention, or (b) performing respective different normalisation techniques to derive respective sets of measurements to which respective acceptance criteria are applied.

BRIEF DESCRIPTION OF THE DRAWINGS

Arrangements embodying the invention will now be described by way of example with reference to the accompanying drawings, in which.

DETAILED DESCRIPTION OF THE PREFERRED EMBODIMENTS

Figure 1:
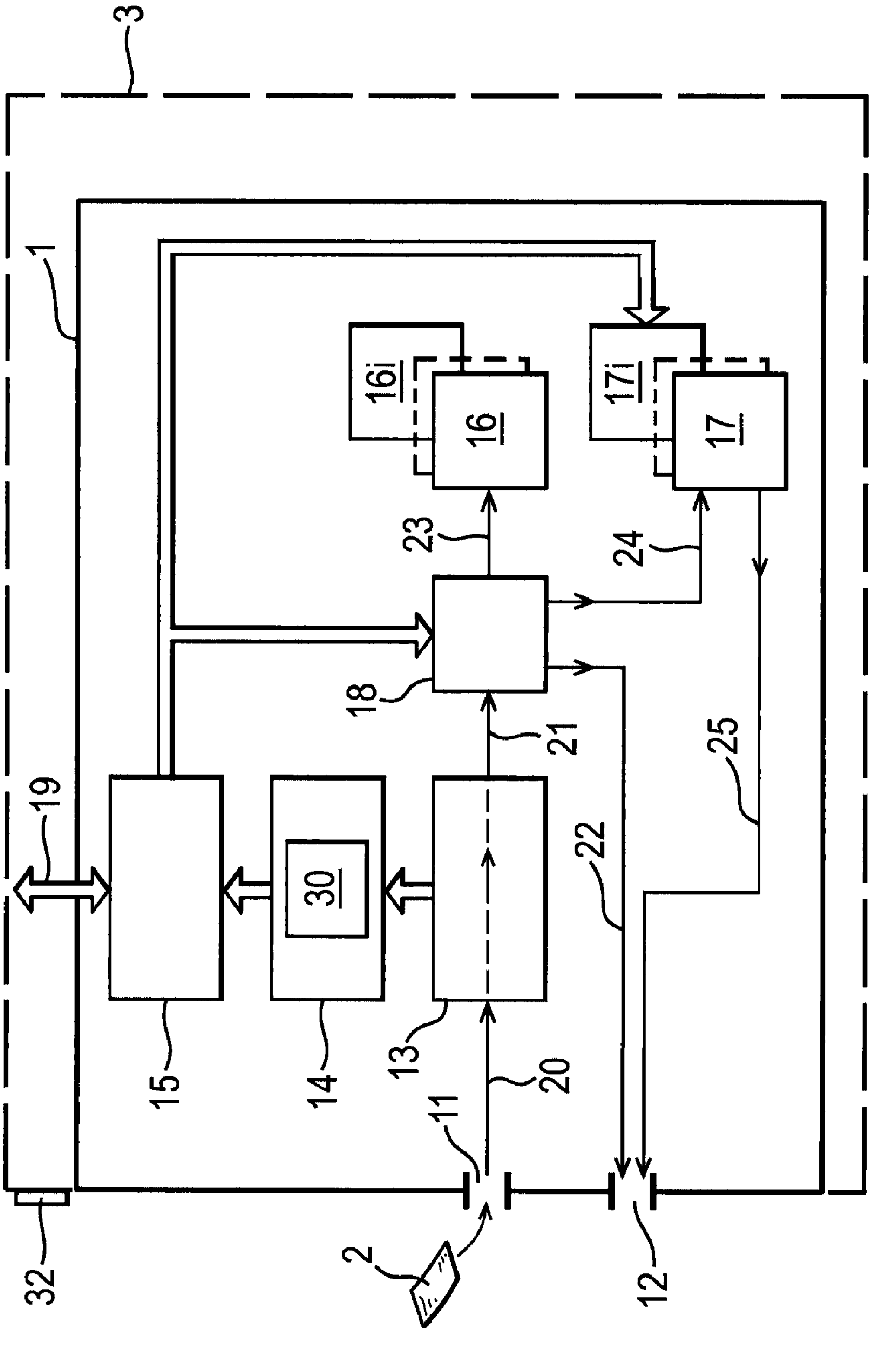
FIG. 1 is a block diagram of an automatic transaction machine incorporating a banknote validator in accordance with the invention.

FIG. 1 shows diagrammatically an automatic transaction system (such as a vending machine) 3 including a banknote validator 1 according to the invention. The validator has at least one receiving opening 11 and at least one dispensing opening 12 for receiving and returning banknotes, and further comprises a measuring unit 13, a decision unit 14 with a data store 30, a control unit 15, a plurality of one-way stores 16 . . . 16*i* and a plurality of two-way stores 17 . . . 17*i*. These units are connected by transport means 20, 21, 22, 23, 24, 25 and a common routing element 18.

After a banknote 2 has been inserted into the receiving opening 11 it is taken by a first transport means 20 to the measuring unit 13 which contains the measuring apparatus required for checking acceptability and determining denomination. The measurements made there are passed to the decision unit 14 which processes them with data stored in the data store 30 and decides whether the banknote is acceptable and, if so, whether it is of a type assigned for re-use. The control unit 15 is instructed to control the common routing element 18 of the transport system accordingly: upon leaving the measuring unit 13 a non-acceptable banknote is transported directly back to the dispensing opening 12; an acceptable banknote that is not to be re-used is directed by the routing element 18 onto transport means 23 and is transported to one of several one-way stores 16 . . . 16*i*; an acceptable banknote that is to be available for re-use is directed by the routing element 18 onto transport means 24 and is taken to one of several two-way stores 17 . . . 17*i* and stored.

The two-way stores 17 . . . 17*i* can be controlled by the unit 15 to supply the desired type and number of banknotes 2 to the dispensing opening 12 via transport means 25.

The banknote validator 1 as described so far corresponds to prior art arrangements, and may operate as follows. Each banknote received at the receiving opening 11 is measured in unit 13, using optical tests involving determining the reflectivity and transmissivity of the banknote in different areas and in different spectral regions. The banknote is preferably scanned in areas distributed over substantially at least one entire surface, and preferably both surfaces, in order to derive multiple measurements.

Unit 14 then processes those measurements with stored data from store 30 representative of a number of different target classes, each target class corresponding to a respective authentic denomination, and possibly using other target classes corresponding to known counterfeit banknotes. Many suitable processing techniques are known to those skilled in the art. As is well known, the testing procedure generally involves separate tests (using different data) to determine whether a received banknote belongs to each of the respective target classes or denominations.

If the decision unit 14 determines, within a predetermined level of certainty, that the received banknote belongs to a genuine target denomination, an appropriate signal is sent to the control unit 15. This in turn sends a signal to a control section (not shown) of the automatic transaction machine 3 via a bi-directional path 19. The transmitted signal is representative of the amount of credit to be granted to the user in return for the received banknote.

The automatic transaction system 3 preferably incorporates a display 32, and is arranged to cause the display 32 to display the amount of credit granted to the user.

The genuine banknote is caused to be sent to an appropriate one of the stores 16 . . . 16*i*, or if the banknote is of a denomination that is replenishable and dispensable, to one of the two-way stores 17 . . . 17*i*.

After a transaction, e.g. a vending operation, the machine 3 can send on path 19 signals to cause the control unit 15 to refund a predetermined amount from two-way stores 17 . . . 17*i*.

Figure 2:
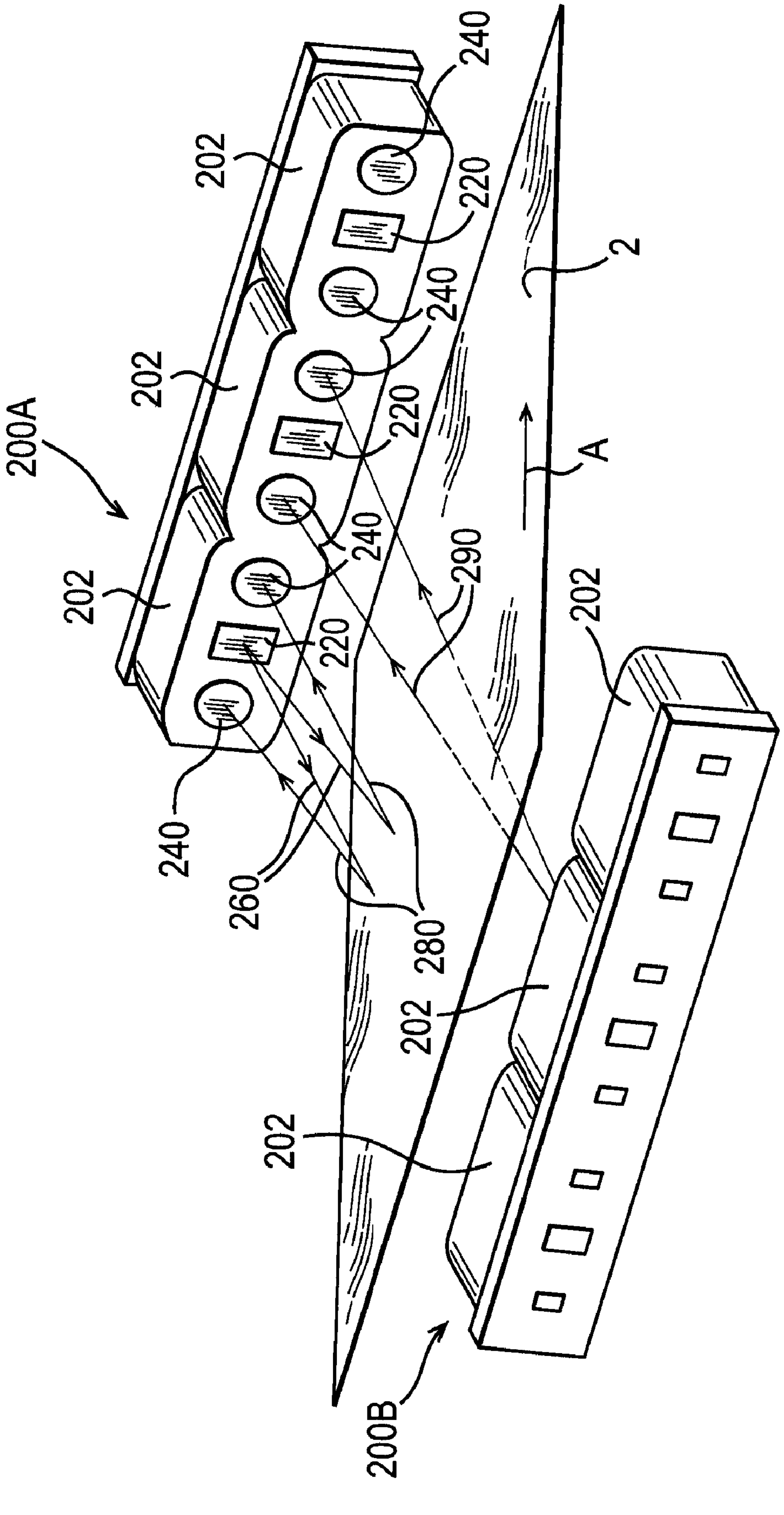
FIG. 2 schematically shows part of a measuring unit of the validator.

The measuring unit 13 is preferably arranged geometrically as described in EP-A-1321904 (incorporated herein by reference) for the purposes of taking reflection and transmission measurements, but differs therefrom in relation to the details described below. The optical characteristics of banknotes are measured by using modules arranged in pairs, with the banknote path passing between the modules of each pair. FIG. 2 shows a typical pair of modules, 200A and 200B, in the process of scanning a banknote 2.

In the illustrated embodiment, each module comprises three optical units 202 positioned side-by-side along a line which is parallel to the width dimension of the banknotes passing between the modules, and transverse to (preferably perpendicular to) the transport direction shown by arrow A.

As shown in FIG. 2, the optical units 202 of each module face corresponding units 202 of the opposed module. The optical units of the modules are arranged for emitting and receiving light travelling in a plane extending between the two modules which is inclined with respect to the transport plane of the banknotes.

Each optical unit comprises an emitter 220 disposed between two sensors 240. Each emitter can direct light to an area of a banknote passing between the modules, which then diffusely reflects the light to the adjacent sensors 240. Exemplary light rays emitted by an emitter are shown at 260, and diffusely reflected light at 280. Also, each emitter 220 is operable to transmit light through the banknote to a pair of sensors 240 in the corresponding unit 202 of the facing module on the opposite side of the banknote path, for example as illustrated at 290. Thus, as each banknote passes between the modules, travelling in the direction shown by arrow A, each sensor scans a respective line extending along the banknote, taking both reflection and transmission measurements at multiple points along the scanned line.

Each emitter comprises multiple light-emitting dies (not shown), which emit light of respective different colours. These are driven in succession. Accordingly, each sensor 240 can detect both reflection and transmission characteristics in respective different wavelengths at multiple positions along the line being scanned by the sensor, the sensors 240 being arranged along a line transverse thereto.

Although this is the preferred embodiment, it would alternatively be possible to have an arrangement in which each emitter emits light extending across a broad spectrum, and each sensor comprises multiple individual receiving elements, each provided with a filter so as to detect light within a restricted wavelength band.

Figure 3:
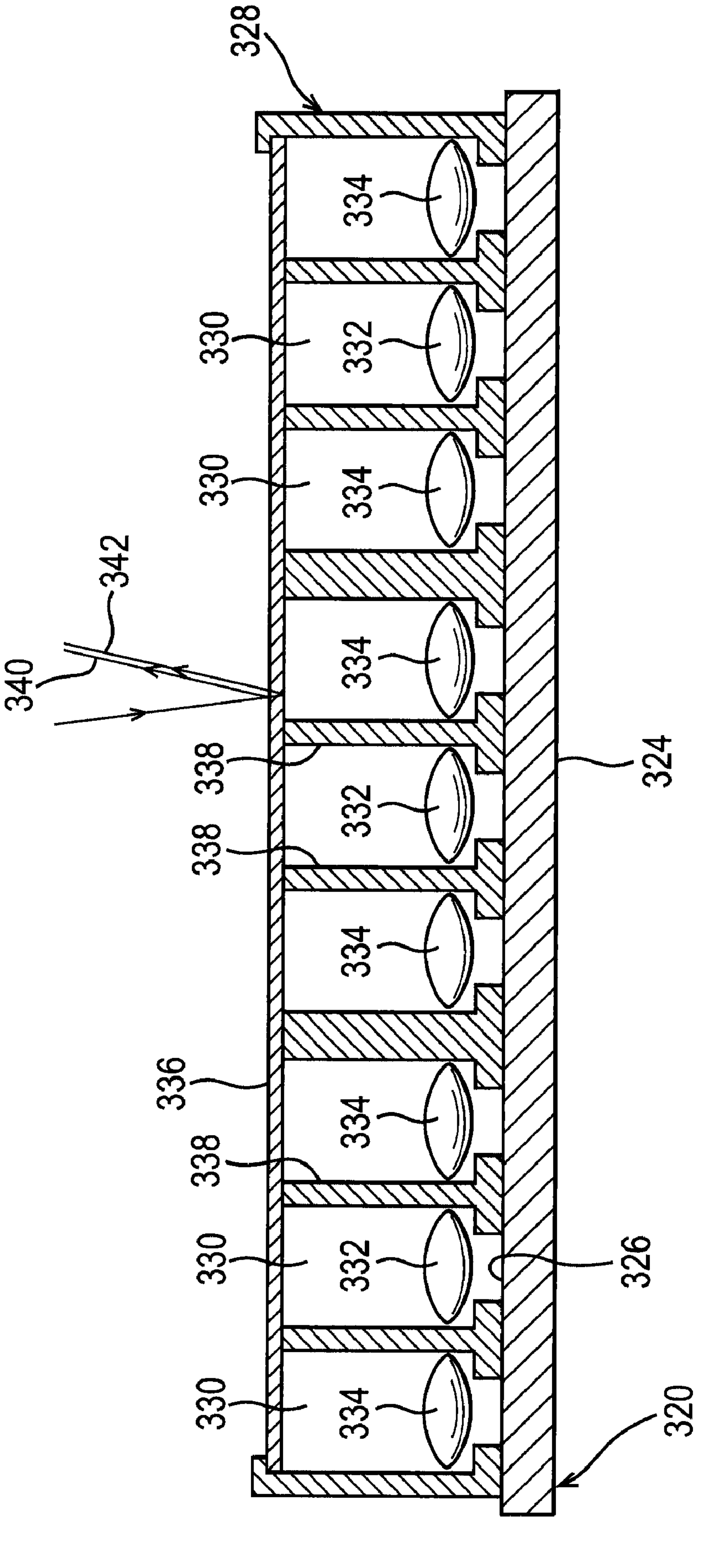
FIG. 3 is a diagrammatic cross-section of an optical unit of the measuring unit.

FIG. 3 is a longitudinal cross-section through one of the modules. Each module comprises a substrate formed by a circuit board 320. The circuit board has a rear surface 324 and an opposed, front surface 326, both of which carry electronic components (not shown in FIG. 3 for purposes of clarity). The components on the front surface of the circuit board include the light emitting components forming each emitter and the light receiving components forming each sensor. A plastics housing 328 is affixed to the front surface of the circuit board, the housing being formed with apertures, some of which are indicated at 330, to expose the light emitting and light receiving components. Collimating emitter lenses 332 are supported by the housing and overlie the emitter components. Similarly, collimating sensor lenses 334 are supported by the housing and overlie the sensing components. The housing also supports, at its front end, an elongate window 336, preferably made of transparent plastics material such as a polycarbonate, e.g. polymethyl methacrylate, which overlies the lenses of the emitters and the sensors. The housing is formed with separating walls, some shown at 338, which ensure the light from each of the emitters cannot be reflected by the window to the adjacent sensors.

The window 336 of each module faces the opposite module. Although the windows are transparent, a proportion of the light incident on the window will be reflected instead of being transmitted. Accordingly, when no banknote is present between the modules, light from the emitters of each module can reach the window of the opposite module and some of that light will be directly (specularly) reflected back to the first module. Approximately 5% of the light will be reflected by the air/window interface at the front of the window as illustrated at 340, and about 5% of the remaining light will be specularly reflected back by the window/air interface at the rear of the window as illustrated at 342. Some of the specularly reflected light will reach the sensors adjacent the emitter from which the light was transmitted. The specularly reflected light received by the sensors is measured during a calibration operation.

The operation of the measuring unit will now be described.

After a banknote 2 is inserted into the opening 11, the banknote is sensed by a detector (not shown), causing the control unit 15 to operate the transport system to deliver the banknote to the measuring unit 13, and also sending a signal to the measuring unit to initiate a calibration operation. The calibration operation is performed before the banknote 2 has time to reach the measuring unit 13.

The calibration operation involves each multi-colour emitter being driven to emit, in succession, light of each wavelength. For each wavelength, a reading is taken from each of the adjacent sensors. Assuming the number of wavelengths is C, and there are N sensors, this will result in C×N calibration readings.

The calibration readings can be used in a number of different ways to render the system less susceptible to component variations (which may be due to wide component tolerances, aging, drift, etc.), as will be explained in more detail below. For the purposes of the present explanation, it will be assumed that each sensor has a variable gain component coupled to its output, and the gain of this component is adjusted to a different setting for each wavelength emitted by the emitter. The calibration readings are used to generate gain settings which alter the output of each sensor so that, during calibration, the readings of each wavelength are made to correspond to predetermined values.

Following the calibration operation, the banknote 2 is transported between the modules 200A and 200B, and transmission and reflection readings are taken in a validation operation. If there are N sensors, then the banknote will be scanned along N longitudinal tracks. Assuming that measurements of all colours are taken at P positions along each track, then the total number of reflection measurements taken will be C×N×P on each side of the banknote. There will additionally be C×N×P transmission measurements taken by the sensors of one of the modules. (If desired, transmission measurements can also be made by the sensors of the other module.)

The decision unit 14 makes use of these measurements to determine the authenticity and denomination of the banknote. The measurements are first normalised by the decision unit 14. Assume that the measurements are represented by:

$$M_{c,n,p,s,t}$$

where c is indicative of the wavelength, (c=1, 2, . . . C), n represents the sensor, or track (n=1, 2, . . . N), p represents the position along the track (p=1, 2, . . . P), s represents the side (upper or lower) of the banknote (s=1, 2) and t represents the type (reflection or transmission) of measurement (t=1, 2). Examples of normalisation algorithms are as follows.

EXAMPLE 1

For each measurement in track n' on side s', the measurement is normalised using the function:

$$M_{NORM_{c',n',p',s',t'}} = \frac{M_{c',n',p',s',t'}}{\sum_{c=1,p=1}^{c=C,p=P} M_{c,n',p,s',t'}} \quad (1)$$

Thus each measurement is normalised by dividing it by the sum of all other measurements in a group of the same type t' (transmission or reflection) in the same track n' and on the same side s' of the banknote. (The average of these measurements could be used instead of the sum.) Accordingly, each measurement is normalised with reference to the measurements distributed along the entirety (or at least substantially the entirety) of the same scan line, which in this embodiment means the remaining measurements made by the same sensor (and using the same group of emitters).

This technique can provide up to C×N×P×S×T normalised measurements $M_{NORM_{c'n'p's't'}}$, where S=T=2, each normalised measurement value representing a respective first measurement value $M_{c',n',p',s',t'}$.

EXAMPLE 2

The measurements may instead be normalised using the following algorithm:

$$M_{NORM_{c',n',p',s',t'}} = \frac{M_{c',n',p',s',t'} - m_{n',p',s',t'}}{\sigma_{n',p',s',t'}} \quad (2)$$

where $$m_{n',p',s',t'} = (1/C)\sum_{c=1}^{c=C} M_{c,n',p',s',t'} \quad (3)$$

is the mean of the measurements of type t' of the colours c=1 to C at the position n',p',s', and where $\sigma_{n',p',s',t'}$ represents the calculated standard deviation (or a different measure of dispersion) of the measurements $M_{c,',n',p',s',t'}$ (c=1 to C).

For example, $$\sigma_{n',p',s',t'} = \sqrt{(1/C)\sum_{c=1}^{c=C} (M_{c,n',p',s',t'} - m_{n',p',s',t'})^2} \quad (4)$$

This algorithm normalises with reference to measurements of multiple wavelengths at a single position, and has the benefit of reducing dispersion in the measurements resulting from varied ink densities due to wear and/or different printing conditions.

This technique can also provide up to C×N×P×S×T normalised measurements $M_{NORM_{c'n'p's't'}}$, there S=T=2, each normalised measurement value representing a respective first measurement value $M_{c',n',p',s',t'}$.

EXAMPLE 3

According to this example, the measurements are divided into groups each containing measurements of multiple colours c of the same type t. The measurements within each group relate to multiple positions, at least some (and possibly all) of which are contiguous, and which may lie on the same side s or on opposite sides of the banknote. The groups may be different for different target classes. A mapping process is used to derive a set of position identifiers i=1 to l from the parameters p, n and s.

Figure 4:
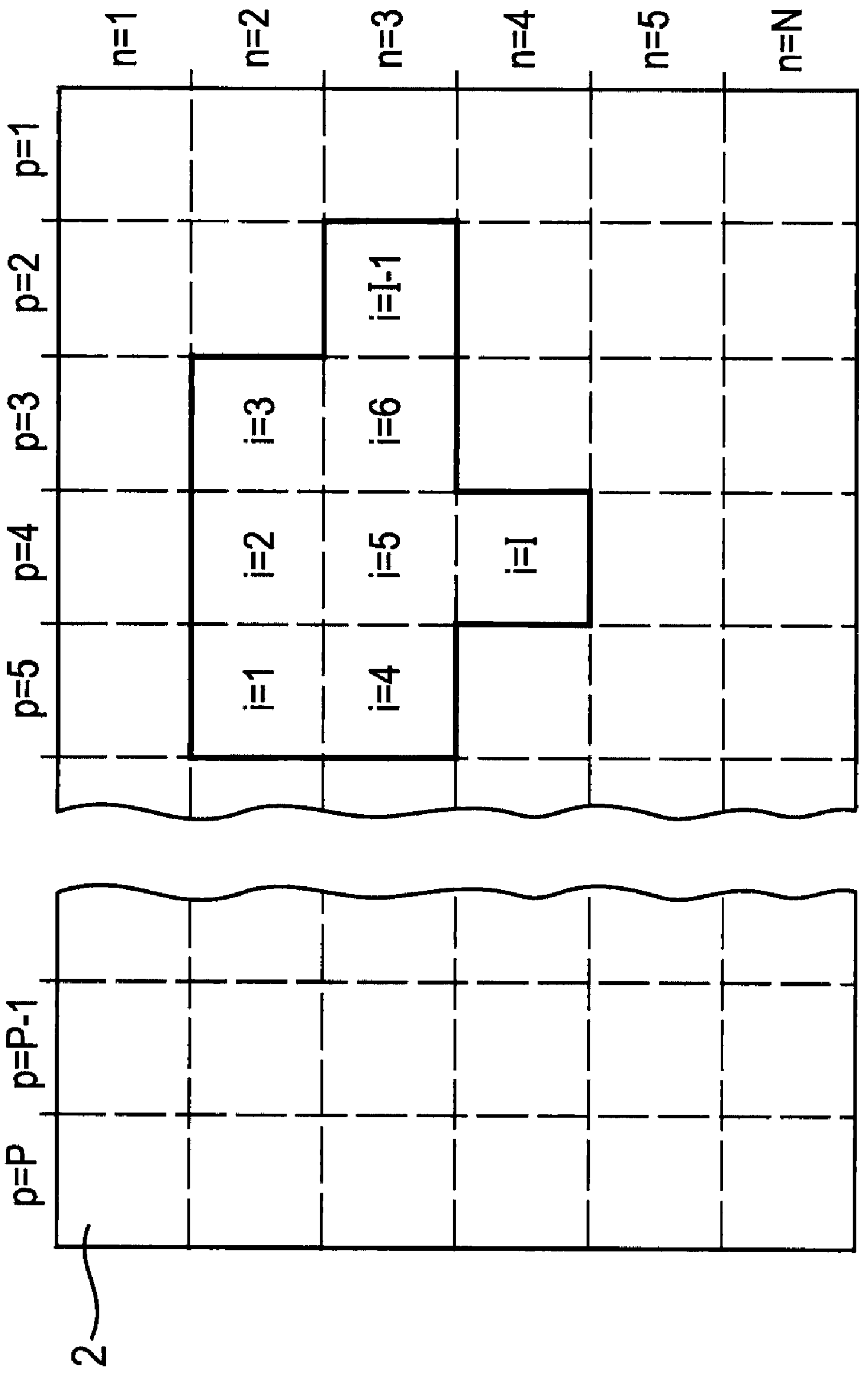
FIG. 4 is a diagram showing how measurements in different areas of a banknote can be grouped for normalisation purposes.

FIG. 4 illustrates an example of how, for one target class, a measurement group is derived from the parameters p, n and s. Assuming the group comprises measurements on a single side s=1, then location i=1 corresponds to the position where s=1, p=5 and n=2; location i=2 corresponds to the position where s=1, p=4 and n=2, etc., and location i=l corresponds to the position where s=1, p=4 and n=4. Other groups may be formed in a similar way. Some measurements may be disregarded, i.e. not included in any group for the current target class. The different groups for respective target denominations may be determined in an empirical manner in a training process before configuring the validator. Data defining the groups may be held in the store 30.

The measurements are then normalised. First, the measurements of each colour within each group are averaged. For each group g (g=1 to G) there will be C average measurements, one for each colour c'. Each average measurement is represented by:

$$A_{c',g'} = \frac{\sum_{i=1}^{i=I} M_{c',g',i}}{I} \tag{5}$$

Then, the averaged measurements are normalised in a manner analogous to the individual measurements in Example 2. Accordingly:

$$M_{NORM_{c',g'}} = \frac{A_{c',g'} - a_{g'}}{\sigma_{g'}} \tag{6}$$

where $$a_{g'} = (1/C)\sum_{c=1}^{c=C} A_{c,g'} \tag{7}$$

and where $\sigma_{g'}$ presents the calculated standard deviation (or a different measure of dispersion) of the averaged measurements $A_{c,g'}$ (c=1 to C) of a group g'.

For example, $$\sigma_{g'} = \sqrt{(1/C)\sum_{c=1}^{c=C} (A_{c,g'} - a_{g'})^2} \tag{8}$$

This technique can provide up to C×G normalised measurements $M_{NORM_{c'g'}}$, each normalised measurement value representing a respective first measurement value $A_{c',g'}$ obtained by a spatial averaging technique.

EXAMPLE 4

In this example, the techniques of Examples 1 and 2 are combined. Accordingly, each of the normalised measurements is represented by:

$$M_{NORM_{c',n',p',s',t'}} = \frac{N_{c',n',p',s',t'} - n_{n',p',s',t'}}{\sigma_{n',p',s',t'}} \tag{9}$$

where $$n_{n',p',s',t'} = (1/C)\sum_{c=1}^{c=C} N_{c,n',p',s',t'} \tag{10}$$

and $$\sigma_{n',p',s',t'} = \sqrt{(1/C)\sum_{c=1}^{c=C} (N_{c,n',p',s',t'} - n_{n',p',s',t'})^2} \tag{11}$$

and $$N_{c',n',p',s',t'} = \frac{M_{c',n',p',s',t'}}{\sum_{c=1,p=1}^{c=C,p=P} M_{c,n',p,s',t'}} \tag{12}$$

Thus, the measurements are first normalised according to the techniques of Example 1, and then further normalised according to the techniques of Example 2. Accordingly, this technique can also provide up to C×N×P×S×T normalised measurements $M_{NORM_{c'n'p's't'}}$, where S=T=2, each normalised measurement value representing a respective first measurement value $N_{c',n',p',s',t'}$ which itself is obtained by normalising a quantity $M_{c',n',p',s',t'}$ derived from a respective measurement with respect to a measurement group derived from measurements of plural different wavelengths at positions distributed over a substantial area of the banknote. This procedure may have the benefits attributable to both the above-described Examples 1 and 2.

As an alternative, measurements of the same colour from selected positions may first be averaged (as in Example 3) before being normalised according to the technique of Example 4. This technique would provide up to C×G normalised measurements $M_{NORM_{c'g'}}$, each normalised measurement value being derived from a respective first measurement value obtained by (a) performing a spatial averaging technique to derive a quantity representing the measurement of a wavelength averaged over multiple positions on the banknote and then (b) performing a preliminary normalisation technique to normalise the quantity with respect to a measurement group derived from measurements of plural different wavelengths at positions distributed over a substantial area of the banknote.

In Examples 1 and 4, the normalisation procedure includes the step of normalising a measurement by taking into account a group of measurements which comprises measurement of the same colour and of other colours distributed along the same track. Instead, the group can comprise measurements from a different region. Preferably, the group comprises measurements distributed over a substantial area; preferably it includes measurements from at least 10 locations which are preferably contiguous but may be non-contiguous. The region may differ according to target denomination. The store 30 may include data defining the regions used for normalisation, in a manner analogous to the data defining the groups used for averaging in Example 3.

It is to be noted that the use of dispersion values in examples 2 to 4 differs significantly from the use of dispersion values as part of the data defining the acceptance criteria used in known algorithms such as described in EP-A-0560023. The dispersion values described above are derived from actual measurements of the banknote under test, and represent the extent to which the measured properties vary with respect to wavelength and/or position. The dispersion values used in the known algorithms described above, on the other hand, are stored values representing the extent to which measurements vary within populations of banknotes of respective denominations, not the banknote currently under test.

If desired, it is possible to obtain plural sets of normalised measurements using respective different algorithms, e.g. a first set using the algorithm of Example 1 and a second set using the algorithm of Example 2 or 3.

After the normalisation of the measurements, the decision unit 14 uses the normalised measurements together with acceptance criteria for respective different target classes defined by the data stored in store 30 to determine whether the banknote belongs to one of those target classes. Various different techniques, known in themselves, can be used to accomplish this. Preferably, however, the chosen technique involves, at least in part, determining whether the relationship between various measurements matches a known correlation, e.g. as determined by a training operation. For example, for each target class, the measurements may be combined to form a feature vector which is processed with data from the store 30 representing an inverse covariance matrix and mean values associated with that target class, in order to derive a Mahalanobis distance. The banknote is deemed to belong to that target class if the Mahalanobis distance is smaller than a predetermined value. Otherwise, the measurements are processed with data for another target class. Preferably, a data-reduction operation is performed when deriving the feature vector so as to reduce the number of dimensions of the vector. For example, the measurements relating to each colour within each scanned line may be combined, thus reducing the number of dimensions by a factor of P. One way of achieving this would be to take the modulus of the difference between the measurement and a mean value stored in store 30, divide by a dispersion value also stored in the store 30, and then take the average of the results. Thus, the measurements would be used to derive a vector with each of its C×N×2×2 dimensions represented by:

$$L_{c',n',s',t'} = \frac{(1/P)\sum_{p=1}^{p=P} M_{NORM_{c',n',p',s',t'}} - M^*_{c',n',s',t'}}{\sigma^*_{c',n',s',t'}} \quad (13)$$

where $M^*_{c',n',s',t'}$ is the stored average (for the target class) of all (normalised) measurements of type t' and colour c' in track n' on the side s' of the banknote, and $\sigma^*_{c'n's't'}$ is the corresponding stored dispersion value for these (normalised) measurements (both such values being derived from measurements of a population of the target class). Other data-reduction operations could be performed as well as, or instead of, the described operation.

To reduce the number of calculations, the measurements (or values derived by combining measurements) may be compared with upper and lower thresholds associated with target classes and the Mahalanobis distance calculation performed only if they fall within the thresholds.

As another example, the normalised measurements may be processed with respective coefficients of a set derived by training a neural network using samples of a target class, and the resultant value examined to determine whether the banknote belongs to that class.

By virtue of the techniques used in the above-described embodiment, the normalised measurements used for validating the banknotes exhibit little variation as a consequence of component differences, while also have little dispersion due to banknote aging and soiling. Consequently, the acceptance criteria permit enhanced recognition and discrimination. This is accomplished while enabling calibration in a transmission system using a simple structure.

Various modifications are possible. For example, in the above-described embodiment, the calibration measurements were used to controlling the gain applied to an output of the sensor during the validation operation. Instead, a calibration measurement may be used to:

(a) determine the intensity with which the emitter illuminates the banknote during the validation operation; or (b) determine an amount of digital adjustment of the measurements obtained during the validation operation.

Two or more of these possibilities could be combined. For example, a calibration measurement may be used to set the emitter intensity as high as possible without saturating any sensor receiving the emitted light. Then a further calibration measurement made at this setting could be used to derive a coefficient (representing the ratio between a predetermined value and the actual calibration measurement), this coefficient then being used to correct the relevant measurements made during validation (before normalisation thereof).

The invention claimed is:

1. A method of examining a banknote, the method comprising performing a validation operation comprising:

taking measurements along a plurality of scan lines to determine optical characteristics of the banknote at respective different positions on the banknote and in respective different wavelengths;

normalising the measurements; and applying acceptance criteria to the normalised measurements to determine whether they represent a target banknote class;

wherein each particular measurement is normalised with respect to a measurement group comprising a plurality of sets of measurements, each set comprising measurements of a respective different wavelength at positions distributed over a particular one of the scan lines in which the particular measurement was taken, and wherein the method is performed by a banknote validator.

2. A method as claimed in claim 1, wherein the measurements of each set are distributed along at least substantially the entire length of a scanned line of the banknote.

3. A method as claimed in claim 2, wherein each measurement group is formed by a plurality of sets of measurements all derived by scanning a common line.

4. A method as claimed in claim 1, wherein the measurements of each group are made using a respective different sensor from the measurements of the other groups.

5. A method of examining a banknote, the method comprising performing a validation operation including:

taking measurements to determine optical characteristics of the banknote at respective different positions on the banknote and in respective different wavelengths;

deriving normalised measurement values from the measurements; and applying acceptance criteria to the normalised measurement values to determine whether they represent a target banknote class;

wherein the normalised measurement values are derived by (i) classifying first measurement values obtained from the measurements into measurement groups each comprising measurement values for different wavelengths at least one position on the banknote, and (ii) deriving normalised measurement values each representing a relationship between a respective first measurement value and a dispersion value representing the dispersion of first measurement values in the group to which that first measurement value belongs, and wherein the method is performed by a banknote validator.

6. A method as claimed in claim 5 wherein each normalised measurement value represents the ratio of (i) the difference between the corresponding first measurement value and the average of the measurement values of the measurement group, and (ii) said dispersion value.

7. A method as claimed in claim 5, wherein each first measurement value is derived by averaging measurements of a respective wavelength at selected positions distributed over the banknote.

8. A method as claimed in claim 5, wherein each first measurement value is derived by a normalisation operation in which a quantity representing the measurement of a wavelength at least one position on the banknote is normalised with respect to a measurement group derived from measurements of plural different wavelengths at positions distributed over a substantial area of the banknote.

9. A method as claimed in claim 1 or 5, including performing a calibration operation to obtain a calibration measurement which is independent of the banknote and influencing the validation operation in accordance with the calibration measurement so as to compensate for component variations.

10. A method as claimed in claim 9, wherein the calibration operation comprises:

operating an emitter on one side of a banknote path; and using a sensor located on said one side of the banknote path to detect light which has been emitted by the emitter and reflected from a window on the other side of said banknote path.

11. A method as claimed in claim 10, wherein the measurements taken in said validation operation comprise reflection measurements made using said emitter and said sensor, and transmission measurements using light travelling between (i) an optical device which is overlain by said window and (ii) one of said emitter and sensor.

12. An apparatus for examining a banknote comprising:

a measuring unit operable to take measurements along a plurality of scan lines to determine optical characteristics of the banknote at respective different positions on the banknote and in respective different wavelengths;

a decision unit operable to normalize the measurements and operable to apply acceptance criteria to the normalized measurements to determine whether they represent a target banknote class, wherein each particular measurement is normalized with respect to a measurement group comprising a plurality of sets of measurements, each set comprising measurements of a respective different wavelength at positions distributed over a particular one of the scan lines in which the particular measurement was taken.

13. An apparatus for examining a banknote comprising:

a measuring unit operable to take measurements to determine optical characteristics of the banknote at respective different positions on the banknote and in respective different wavelengths;

a decision unit operable to deriving normalized measurement values from the measurement and operable to apply acceptance criteria to the normalized measurement values to determine whether they represent a target banknote class, wherein the decision unit is operable to derive the normalized measurement values by (i) classifying first measurement values obtained from the measurements into measurement groups each comprising measurement values for different wavelengths at least one position on the banknote, and (ii) deriving normalised measurement values each representing a relationship between a respective first measurement value and a dispersion value representing the dispersion of first measurement values in the group to which that first measurement value belongs.

* * * * *

UNITED STATES PATENT AND TRADEMARK OFFICE

CERTIFICATE OF CORRECTION

PATENT NO. : 7,913,832 B2
APPLICATION NO. : 11/755561
DATED : March 29, 2011
INVENTOR(S) : Christian Voser It is certified that error appears in the above-identified patent and that said Letters Patent is hereby corrected as shown below:

Column 12, claim 5, line 64, change “at” to -- at at --;

Column 13, claim 8, line 17, change “at” to -- at at --;

Column 14, claim 13, line 30, change “at” to -- at at --.

Signed and Sealed this
Twenty-eighth Day of June, 2011

David J. Kappos
*Director of the United States Patent and Trademark Office*